United States Patent [19]

Yamaguchi et al.

[11] Patent Number: 4,797,758
[45] Date of Patent: Jan. 10, 1989

[54] PINCH ROLLER DRIVING MECHANISM

[75] Inventors: Katsumi Yamaguchi; Syouichiro Yokoi; Takao Kanai; Kikuo Yoshikawa, all of Tokyo, Japan

[73] Assignee: Clarion Co., Ltd., Tokyo, Japan

[21] Appl. No.: 713

[22] Filed: Jan. 6, 1987

[30] Foreign Application Priority Data

Jan. 14, 1986 [JP] Japan .................................. 61-6052
Jan. 14, 1986 [JP] Japan .................................. 61-6051
Jan. 14, 1986 [JP] Japan .............................. 61-3223[U]
Jan. 29, 1986 [JP] Japan ............................ 61-10382[U]

[51] Int. Cl.⁴ .............................................. G11B 15/66
[52] U.S. Cl. .......................................... 360/85; 360/95
[58] Field of Search ...................... 360/85, 84, 95, 90

[56] References Cited

U.S. PATENT DOCUMENTS 4,566,047  1/1986  Hirose et al. ......................... 360/85
4,594,624  6/1986  Kanchiku et al. ................. 360/95 X Primary Examiner—John H. Wolff
Attorney, Agent, or Firm—Flynn, Thiel, Boutell & Tanis

[57] ABSTRACT

A pinch roller driving mechanism includes a second cam gear linked with a first cam gear which drives a loading block, and a pinch roller is driven by a pinch roller driving arm engaged with a grooved cam of the second cam gear.

Owing to this construction, the timing of movement of the pinch roller can be deviated from that of the loading block, so that the path of movement of the pinch roller can be superposed on the path of movement track of the loading blocks, what can make the construction smaller.

8 Claims, 6 Drawing Sheets

PINCH ROLLER DRIVING MECHANISM

FIELD OF THE INVENTION

This invention relates to a pinch roller driving mechanism for driving a pinch roller in a digital audio type tape recorder provided with a rotating head and in particular to a pinch roller driving mechanism, which is made smaller by staggering the working timing of the pinch roller and that of the loading block.

BACKGROUND OF THE INVENTION

Recently techniques for recording digital signals obtained by transforming audio signals, which are analogue signals, on a tape are being developed with the development of the digital audio techniques. Since an extremely wide frequency band exclusively used therefor is necessary for transforming analogue signals into digital signals, it is required that the contact area per unit time in a magnetic head for recording signals on a tape or reproducing them is large. For this purpose, since it is an indispensable condition to adopt a rotating head system instead of the conventional fixed head system, heretofore various kinds of tape recorders provided with a rotating head based on such a condition have been proposed.

Such a tape recorder is so constructed that the tape is extracted by a loading block from a tape cassette, which has been loaded, and that it is wound round the rotating head. Because of this construction it is necessary that the pinch roller thrusting the tape against the capstan can move forward and backward likewise as the loading block.

In this case, the loading block and the pinch roller should be juxtaposed in close vicinity to each other before the tape loading, and at the tape loading they move along respective arc-shaped trajectories towards the rotating head. Therefore a fairly large space is necessary for their movement. Consequently there was a problem that the mechanism was large, when a space sufficiently large for arranging and working both the members should be secured. This is in opposition to the strong requirement that a tape recorder especially for use on vehicles, etc. should be compact. Therefore it was an important problem to be solved.

OBJECT OF THE INVENTION

This invention has been done in order to remove the drawback of the prior art techniques described above and its object is to provide a pinch roller driving mechanism permitting to realize a digital audio type tape recorder having a rotating head, which has a compact construction and can be satisfactorily used on vehicles.

SUMMARY OF THE INVENTION

In order to achieve this object, a pinch roller driving mechanism for a digital audio type tape recorder provided with a rotating head according to this invention comprises a first cam gear having a first grooved cam and driven by a motor for tape loading; a first cam plate supported rotatably, having an engaging portion engaging with the first grooved cam of the first cam gear at one of its extremities and a rotation transmitting portion at the other extremity; a pair of loading gears for driving a pair of tape loading blocks, being rotated, linked with the rotation transmitting portion of the first cam plate, so that a tape is loaded around the rotating head; a second cam gear having a second grooved cam and engaged with one of the loading gears; and a pinch roller driving arm engaged with the second grooved cam of the second cam gear and driving the pinch roller so as to thrust it against the capstan.

In a first advantageous form of realization of this invention the pinch roller driving mechanism comprises further a pinch roller guide groove coupled with a housing mounting groove of the capstan; and a plate spring for thrusting the pinch roller towards its stop position at the coupling portion of the pinch roller guide groove with the housing mounting groove; whereby the pinch roller is driven by the pinch roller driving arm along the pinch roller guide groove.

In a second advantageous form of realization of this invention the pinch roller driving mechanism comprises further a second cam plate supported rotatably and engaged with the first grooved cam of the first cam gear; a linking plate linked rotatably with the second cam plate at one of its extremities and having a slit at the other extremity; a pinch roller thrusting plate provided with a position regulation portion inserted in the slit of the linking plate and supported rotatably in a domain limited by the position regulation portion; and a thrusting spring disposed between the second cam plate and the pinch roller thrusting plate and energizing the pinch roller thrusting plate so that it pushes the pinch roller against the capstan.

In a third advantageous form of realization of this invention the pinch roller driving mechanism comprises further a pinch roller driving plate engaged with the pinch roller driving arm so as to move linearly; a pinch roller driving rack linked with the pinch roller driving plate through a spring and driven in the same direction as the movement direction of the plate; and a pinch roller drawing out gear engaged with the rack for driving the pinch roller.

DETAILED DESCRIPTION

An embodiment of tape recorders, to which the pinch roller driving mechanism according to this invention, as explained above, is applied, will be explained below more concretely, referring to the drawings.

* Construction

Figure 1:
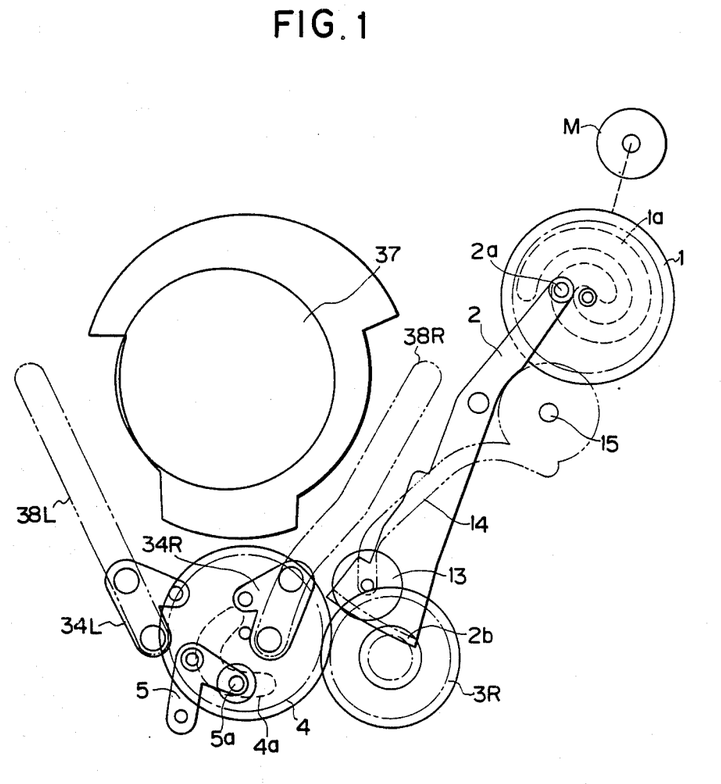
FIG. 1 is a plan view illustrating the principal part of an embodiment of this invention.
Figure 2:
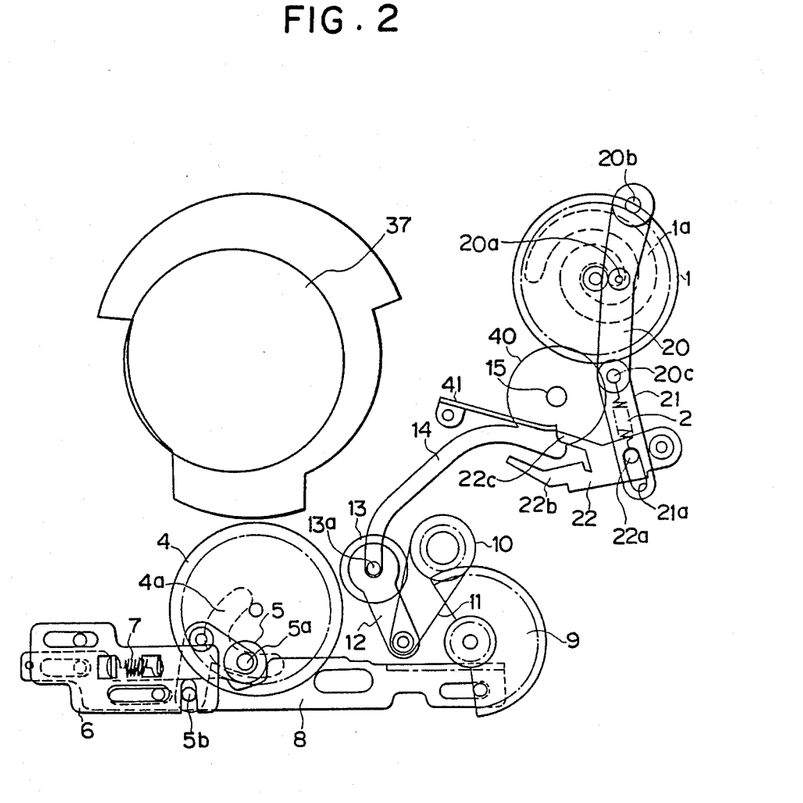
FIGS. 2, 4 and 6 are plan views illustrating the pinch roller driving mechanism and the thrusting mechanism of the same embodiment.
Figure 4:
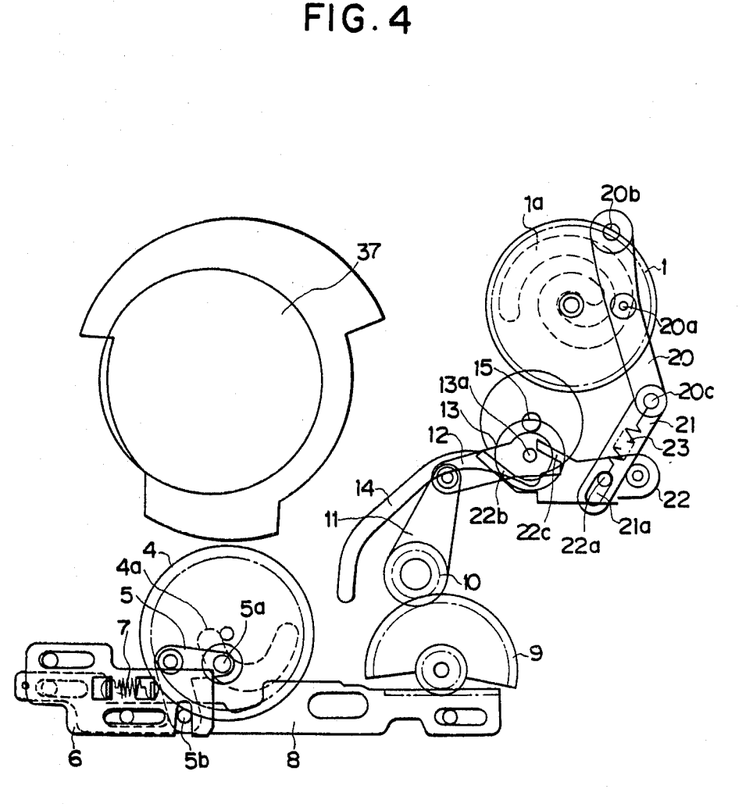

1. Pinch roller driving mechanism: FIGS. 1, 2 and 4

In FIG. 1, the reference numeral 1 indicates a first cam gear or driving gear linked with an inversion type loading motor M through a reduction mechanism not shown in the figures. With a grooved cam 1a formed in the lower surface of the first cam gear 1 is engaged a cam plate 2 for loading and driving a pinch roller by means of an engaging pin 2a disposed on one of its extremities. This cam plate 2 is a driving force transmitting member and is so constructed that it rotates counterclockwise, when the cam gear 1 rotates clockwise, and clockwise, when the cam gear 1 rotates counterclockwise. On the other extremity of this cam plate 2 is formed a gear 2b, with which a right loading gear 3R is engaged. On the lower surface of a second cam gear 4 engaged with this right loading gear 3R is formed a grooved cam 4a, with which an engaging pin 5a mounted on one end of a pinch roller driving arm 5 is engaged.

Figure 5:
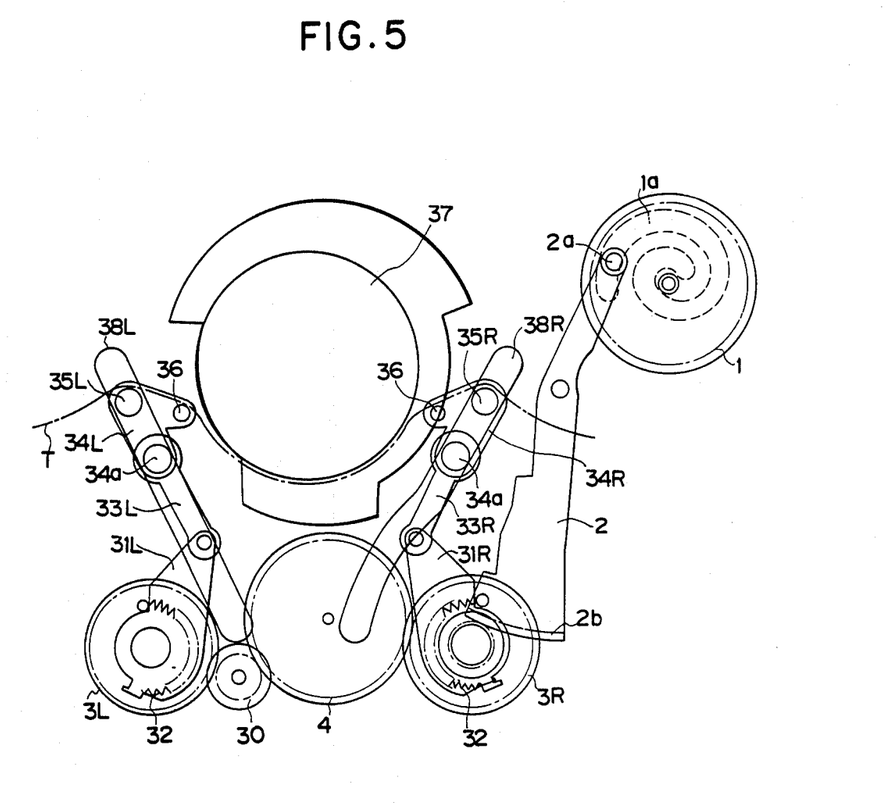
Figure 6:
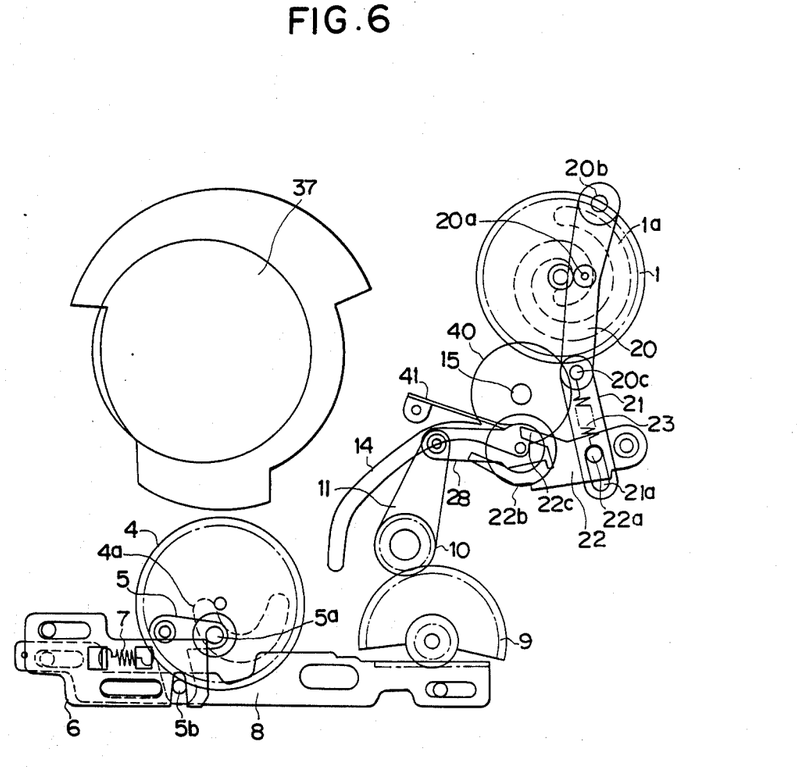

As indicated in FIGS. 2 and 4, the pinch roller driving arm 5 is so constructed that it rotates counterclockwise in the figure, when the first cam gear 1 rotates clockwise, and that it drives a pinch roller driving plate 6 towards right in the figures by means of an engaging pin 5b disposed at the other end. This pinch roller driving plate 6 is linked with a pinch roller driving rack 8 through a spring 7 and this pinch roller driving rack 8 is in turn linked with a pinch roller gear 10 through a linking gear 9. The pinch roller gear 10 is formed on one end of a pinch roller plate 11 in one body with the latter. On the other end of the pinch roller plate 11 is mounted a pinch roller arm 12 rotatably at its one end and on the other end of the pinch roller arm 12 is mounted a pinch roller 13. On the other hand, in the base plate of the tape recorder is formed an arc-shaped guide groove 14, in which the shaft 13a of the pinch roller 13 is inserted. One extremity of the pinch roller guide groove 14 is linked with a housing groove 40 for mounting the housing of a capstan 15 at its outer side. At the linking portion of the pinch roller guide groove 14 and the housing groove 40 is mounted a plate spring 41 for thrusting the pinch roller 13 towards its stop position ( downward in the figure ), as indicated in FIG. 5. Owing to this construction, the pinch roller 13 moves forward after a certain period of time, when the second cam gear 4 rotates counterclockwise ( when the first cam gear 1 rotates clockwise ), and moves backward immediately, when the second cam gear 4 rotates clockwise.

Further, with the grooved cam 1a disposed on the lower surface of the first cam gear 1 is engaged a cam plate 20 for thrusting the pinch roller by means of its engaging pin 20a disposed at its central portion in addition to the cam plate for loading 2 stated previously. This cam plate 20 is rotatable around a shaft 20b disposed at its one end and linked rotatably with one end of a linking plate 21 by means of an engaging pin 20c mounted at the other end thereof. At the other end of the linking plate 21 is formed an engaging hole 21a, in which an engaging pin 22a disposed at one end of a pinch roller thrusting plate 22 is inserted. The pinch roller thrusting plate 22 is so constructed that it rotates in a direction, where the pinch roller 13 is thrusted against or separated from the capstan 15, depending on the rotational direction of the cam plate 20, by means of a spring spanned between the engaging pin 22a and an engaging pin 20c of the cam plate 20. In addition, at the other end of the pinch roller thrusting plate 22 are disposed a thrusting nail 22b and a returning nail 22c in opposition with each other.

Figure 3:
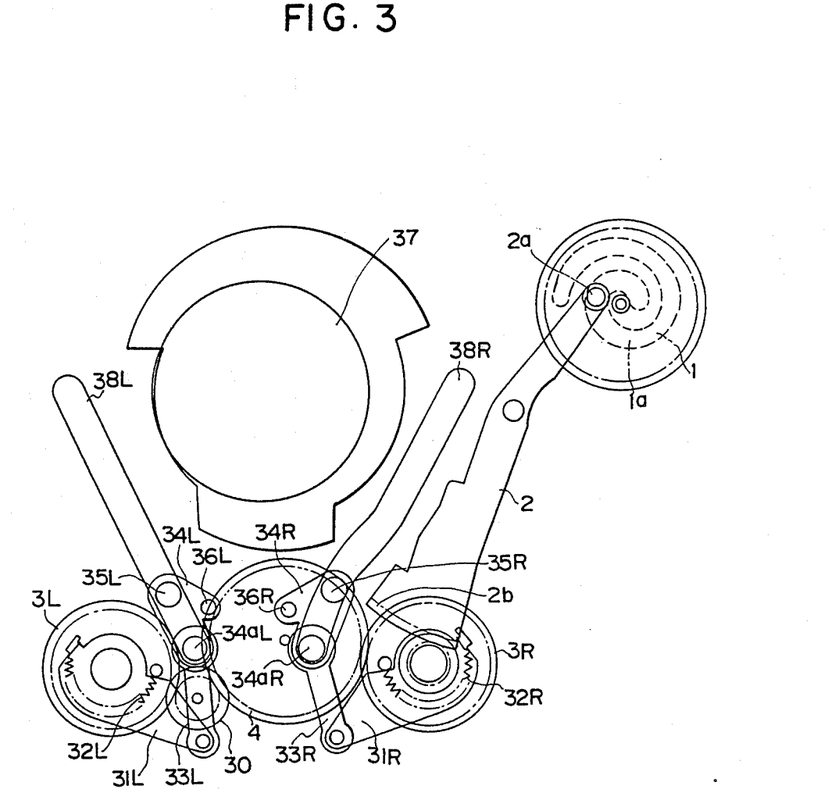
FIGS. 3 and 5 are plan views illustrating the tape loading mechanism of the same embodiment.

2. Tape loading mechanism: FIGS. 3 and 5

The right loading gear 3R is linked with the left loading gear 3L through the second cam gear 4 and a linking gear 30. Owing to this linking structure the right loading gear 3R rotates in the same direction as the first cam gear 1 and the left loading gear 3L rotates in the direction opposite to that of the first cam gear 1.

On the left and the right loading gear 3R and 3L are mounted coaxially an extremity of a loading plate 31R and that of a loading plate 31L. The loading plates 31R and 31L are energized in the rotational direction of the loading gears 3R and 3L, respectively, by springs 32R and 32L disposed between the former and the latter. On the other ends of the loading plates 31R and 31L are mounted rotatably loading arms 33R and 33L, respectively, and on the other ends of the loading arms 33R and 33L are mounted loading blocks 34R and 34L, respectively. These loading blocks 34R and 34L move forward at the loading and draw out the tape T forward by means of vertical posts 35R and 35L and inclined posts 36R and 36L, respectively, which tape T is brought into contact with a rotating head 37 over 90°. On the other hand, in the base plate of the tape recorder are formed guide grooves 38R and 38L corresponding to the loading blocks 34R and 34L, respectively, so that they are more distant from each other with decreasing distance from the rotating head 37. In these left and right guide grooves 38R and 38L are inserted linking shafts 34aR and 34aL for linking them with the loading arms 33R and 33L, respectively.

Owing to this structure, the right and the left loading block 34R and 34L move forward at the same time along the guide grooves 38R and 38L, when the loading gears 3R and 3L rotate clockwise and counterclockwise, respectively, ( when the first cam gear 1 rotates clockwise, ) and move backward at a same time, when the gears 3R and 3L rotate in the inverse directions, respectively.

* Operation

The tape recorder in this embodiment having the structure described above works as follows.

1. At the tape loading

At the tape loading, as soon as the cassette loading by insertion of a cassette has been terminated, the loading motor begins to rotate. In this way the first cam gear 1 rotates clockwise from the position indicated in FIG. 1 through the reduction mechanism.

In accompany with this movement the right loading gear 3R rotates clockwise through the grooved cam 1a on the lower surface of the first cam gear 1 and the cam plate 2 and the left loading gear 3L rotates counterclockwise through the second cam gear 4 and the linking gear 30. In this way the right and the left loading block 34R and 34L move forward.

On the other hand the pinch roller 13 rests at its retreated position indicated in FIG. 2 owing to the grooved cam 4a in the second cam gear 4, until the loading block 34R and 34L have moved forward in some extent. When the second cam gear 4 has rotated by a certain angle, since the engaging pin 5a of the pinch roller driving arm 5 enters the smaller diameter portion of the grooved cam 4a, the pinch roller 13 begins to move forward through the pinch roller driving arm 5 and the pinch roller driving plate 6.

Finally, as indicated in FIG. 5, the vertical posts 35R and 35L on the loading blocks 34R and 34L, respectively, are set by predetermined positioning members. After the tape T has been brought into contact with the rotating head 37, when the first cam gear 4 has rotated by several tens of degrees, they set the tape T in its stop state. At this time the pinch roller 13 is kept by the energizing force of the plate spring 41 at its stop position indicated in FIG. 6. In this way the loading gears 3R and 3L stop. At this time the pinch roller 13 is kept at a position, where it is not in contact with the capstan 15, which position is somewhat before the thrusting position indicated in FIG. 4. Further the right and the left inclined post 36R and 36L are thrusted against positioning stoppers. In addition, the loading blocks 34R and 34L are kept on the side of the rotating head 37 by the springs 32R and 32L disposed between the loading gears 3R and 3L, respectively, and them.

2. At the play

At the play the pinch roller 13 is brought into contact with the capstan 15, as indicated in FIG. 4, by rotating the first cam gear 1 clockwise, making the loading motor rotate, from the state of the tape loading termination stated above. At this time no driving force is transmitted to the loading blocks 34R and 34L because of the grooved cam 1a of the first cam gear 1. When the first cam gear 1 has rotated by a predetermined angle, a play detection switch not shown in the figure is turned on, what makes the reel motor rotates and stops the loading motor. At this time, since the grooved cams of the first and the second cam gear 1 and 4 stop, the loading blocks 34R and 34L and the pinch roller 13 are kept at their play position by the respective spring force.

3. At the fast forward and the rewinding

At the fast forward and the rewinding the loading motor rotates in the inverse direction and the first cam gear 1 rotates counterclockwise. At this time the loading blocks 34R and 34L are kept on the side of the rotating head 37, but the pinch roller 13 is separated from the capstan 15 by the rotation of the pinch roller thrusting plate 22.

When the first cam gear 1 has rotated by a predetermined angle, a switch for fast forward and rewinding not shown in the figure is turned on. By this fact the reel motor rotates, what effects the fast forward or the rewinding.

4. At the eject

At the eject, at first, the pinch roller 13 is separated from the capstan 15 and moves backward contrarily to the movement at the tape loading by making the loading motor rotate in the reverse direction from the stop state. Subsequently the loading blocks 34R and 34L move backward and by this fact a switch not shown in the figure detecting the unloading is turned on and the cassette loading motor is switched on, what effects the eject operation.

As explained above, according to this embodiment, since the working timing of the pinch roller can be deviated from that of the loading blocks at the tape loading and at the eject, it is possible to superpose the track of the pinch roller on that of the loading blocks. That is, also in the same embodiment, as indicated in FIG. 1, the guide groove 14 of the pinch roller 13 and the guide groove 38R of the right loading block 34R are disposed extremely close to each other and thus the pinch roller 13 moves, tracing a track superposed on the guide groove 38R, in the state where both the guide grooves are close to each other. Consequently, in this embodiment, since a remarkable space saving can be realized with respect to the prior art construction, where the pinch roller and the loading blocks are moved simultaneously, and the whole construction can be made smaller, it is possible to provide a tape recorder suitable for use on vehicles.

In addition, this invention is not limited to the embodiment described above at all, but the linkage structure from the pinch roller driving arm to the pinch roller can be conveniently selected. Further the construction for the tape loading mechanism and that for the pinch roller thrusting mechanism can be conveniently selected.

As explained above, according to this invention, in a digital audio type tape recorder having a rotating head, since it is possible to deviate the working timing of the loading blocks from that of the pinch roller by using a second cam gear linked with a first cam gear serving also as the tape loading, it is possible to provide a pinch roller driving mechanism, which can realize a remarkable saving of the space for the movement of both the members by superposing their tracks on each other and contribute to making a tape recorder smaller.

Further, owing to the simple construction, by which a plate spring thrusting the pinch roller to its stop position is disposed at an end portion of the pinch roller guide groove, it is possible to guide surely the pinch roller and no errors in its work are produced at a mode switching over from the tape loading state and the play state. For this reason, since no high precision is required for working the pinch roller guide groove, it is made easier to work it. Furthermore, since the housing groove is secured, it is easy to mount the housing.

In addition, owing to the simple construction, by which the pinch roller thrusting plate is driven by the grooved cam of the cam gear driven by the loading motor through the cam plate and the linking plate, thrusting of the pinch roller can be effected, while the tape remains to be wound round the rotating head. Consequently it is unnecessary to move the loading block at the fast forward/rewinding operation and the stop operation and thus the time necessary for switching over the operation can be shortened. Furthermore cost is reduced with respect to tape recorders, where thrusting of the pinch roller is controlled by a plunger, and no electrically connecting structure is necessary.

Furthermore, since the linkage of the pinch roller driving arm driven by the second cam gear with the pinch roller drawing out rack is effected through the pinch roller driving plate and a spring, the backlash produced at the drive of the pinch roller at the tape loading and at the eject is remarkably reduced. Consequently an infructuous part of the driving force which has been produced by a large backlash, disappears and the load applied to every member is reduced.

The embodiments of the invention in which an exclusive property or privilege is claimed are defined as follows:

1. A mechanism for a tape recorder provided with a rotating head, comprising:
    a driving gear driven by a selectively operable tape loading motor;
    first and second tape loading gears and means responsvive to movement of said loading gears for moving a pair of tape loading blocks to positions in which a tape guided by said loading blocks extends at least partway around said rotating head;
    first driving force transmitting means for transmitting a driving force from said driving gear to said first tape loading gear;
    second driving force transmitting means for transmitting said driving force from said first tape loading gear to said second tape loading gear, said second driving force transmitting means including a rotatable cam gear having thereon a cam; and
    pinch roller driving means engaging said cam of said cam gear for moving a pinch roller toward a capstan in response to rotation of said cam gear, said pinch roller driving means including a pinch roller gear, and said cam on said cam gear causing said pinch roller driving means to initiate movement of said pinch roller at a point in time after said loading blocks have been moved a predetermined distance.

2. The mechanism according to claim 1, wherein said pinch roller driving means includes resilient connection means having at least one spring for coupling said pinch roller driving means with said cam.

3. The pinch roller driving mechanism according to claim 2, wherein said pinch roller driving means includes:
- a pinch roller driving arm and means for effecting movement of said pinch roller driving arm in response to movement of said cam;
- a pinch roller driving plate which engages said pinch roller driving arm and is moved linearly in a predetermined direction in response to movement of said pinch roller driving arm;
- a pinch roller driving rack which is linked with said pinch roller driving plate by said spring and is moved in said predetermined direction by said spring in response to movement of said pinch roller driving plate in said predetermined direction; and
- a linking gear engaged with said rack, said pinch roller driving means effecting movement of said pinch roller in response to movement of said linking gear by said rack.

4. The mechanism according to claim 1, wherein said driving gear has a cam thereon and including pinch roller thrusting means cooperable with said cam on said driving gear for pushing said pinch roller to said capstan in response to rotation of said driving gear.

5. The mechanism according to claim 4, wherein said pinch roller thrusting means includes:
- a cam plate which is supported rotatably and is engaged with said cam of said driving gear;
- a linking plate which has first and second ends, is coupled to said cam plate at said first end, and has a slit at said second end;
- a pinch roller thrusting plate which has an engaging portion inserted in said slit of said linking plate and which is supported for pivotal movement within a range limited by cooperation of said engaging portion and said linking plate; and
- a spring disposed between said cam plate and said pinch roller thrusting plate and urging said pinch roller thrusting plate so as to urge said pinch roller against said capstan.

6. The mechanism according to claim 4, wherein said pinch roller thrusting means includes resilient connection means having at least one spring for coupling said pinch roller thrusting means with said cam on said driving gear.

7. The mechanism according to claim 1, wherein said driving gear has a cam, said first driving force transmitting means engaging said cam on said driving gear and effecting movement of said first tape loading gear in response to rotation of said driving gear and said cam thereon.

8. The mechanism according to claim 1, including:
- a pinch roller guide groove communicating with a housing mounting groove for said capstan, said pinch roller being supported for movement along said guide groove; and
- plate spring means for yieldably urging said pinch roller toward a position in the region of the junction of said pinch roller guide groove with said housing mounting groove;
- wherein said pinch roller driving means includes a pinch roller driving arm which moves said pinch roller along said pinch roller guide groove.

* * * * *